United States Patent [19]

Tsujimura

[11] Patent Number: 4,515,386
[45] Date of Patent: May 7, 1985

[54] GUARD FOR CHAIN WHEEL

[76] Inventor: Kanji Tsujimura, 6-16, 4-chome, Ikunonishi, Ikuno-ku, Osaka, Japan

[21] Appl. No.: 521,919

[22] Filed: Aug. 10, 1983

[30] Foreign Application Priority Data

Jun. 27, 1983 [JP] Japan ............................ 58-100538[U]

[51] Int. Cl.³ .............................................. B62H 1/02
[52] U.S. Cl. ................................................ 280/289 G
[58] Field of Search .......................... 280/289 G, 261; 474/202

[56] References Cited

FOREIGN PATENT DOCUMENTS 2236714 2/1975 France ............................ 280/289 G
83591 8/1956 Netherlands .................... 280/289 G Primary Examiner—Joseph F. Peters, Jr.
Assistant Examiner—Donn McGiehan
Attorney, Agent, or Firm—Wenderoth, Lind & Ponack

[57] ABSTRACT

A guard for a chain wheel on a bicycle used in the mountains. It extends along the lower half of the outer periphery of the chain wheel and has one or more shock absorbing portions formed by partially bending the guard itself.

2 Claims, 5 Drawing Figures

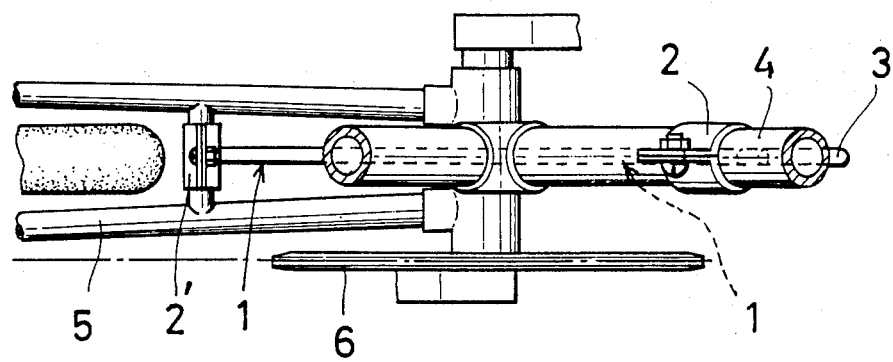
FIG.3
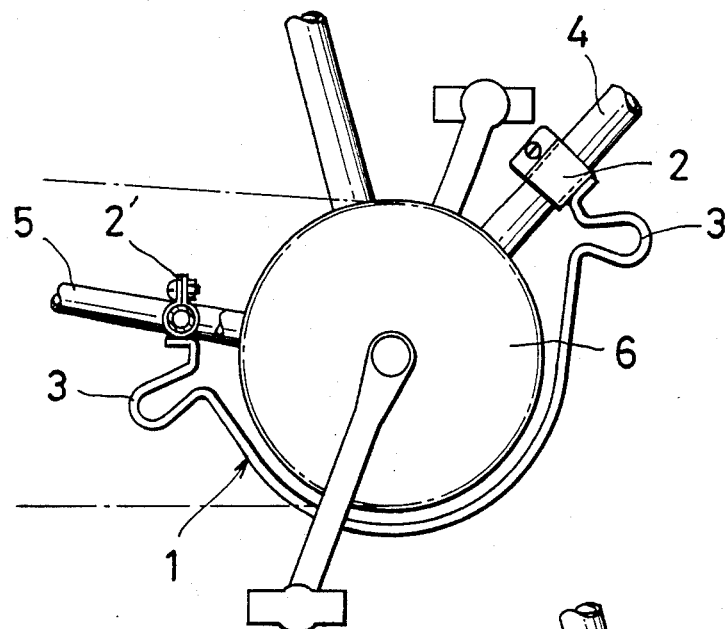
FIG.4
FIG.5
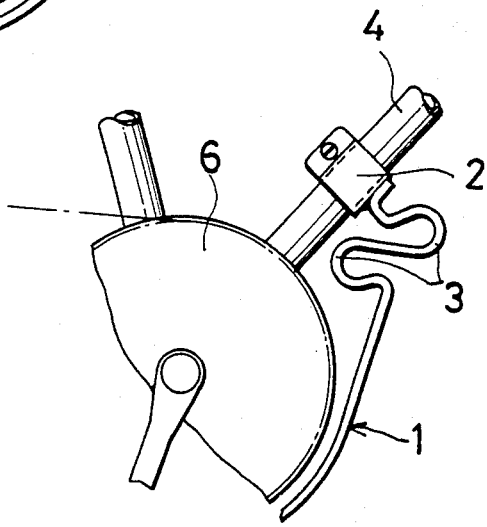

GUARD FOR CHAIN WHEEL

The present invention relates to a guard for protecting the chain wheel of a bicycle used to run in and across the mountains.

With bicycles for such a special use, a chain cover is usually omitted because it is liable to get damaged due to bumping against rocks or roughness of the road, resulting in impossible riding. Thus a chain wheel is exposed. In riding about on such a bicycle in the mountains, the chain wheel is apt to bump against rocks or undulations on the ground, thus resulting in malfunction. Also, shock is transmitted to the bicycle frame, damaging it.

An object of the present invention is to provide a guard for a chain wheel on a bicycle of this type which prevents the chain wheel from directly bumping against rocks or the like and prevents shock from being transmitted to the bicycle frame.

In accordance with the present invention, there is provided a guard for a chain wheel which is adapted to extend along the lower half of the outer periphery of the chain wheel and is attached to the bicycle frame at its each end. Also, one or more shock absorbing portions are provided on the guard to absorb shock and prevent the shock from being transmitted to the frame and thus damaging it.

Other objects and features of the present invention will become apparent from the following description taken with reference to the accompanying drawings, in which:

FIG. 3 is a partially cutaway enlarged plan view of a portion thereof; and

FIG. 4 is a partially cutaway enlarged side view showing another example of the shock absorbing portion.

FIG. 5 is an enlarged side view showing a further example of the shock absorbing portion.

Figure 1:
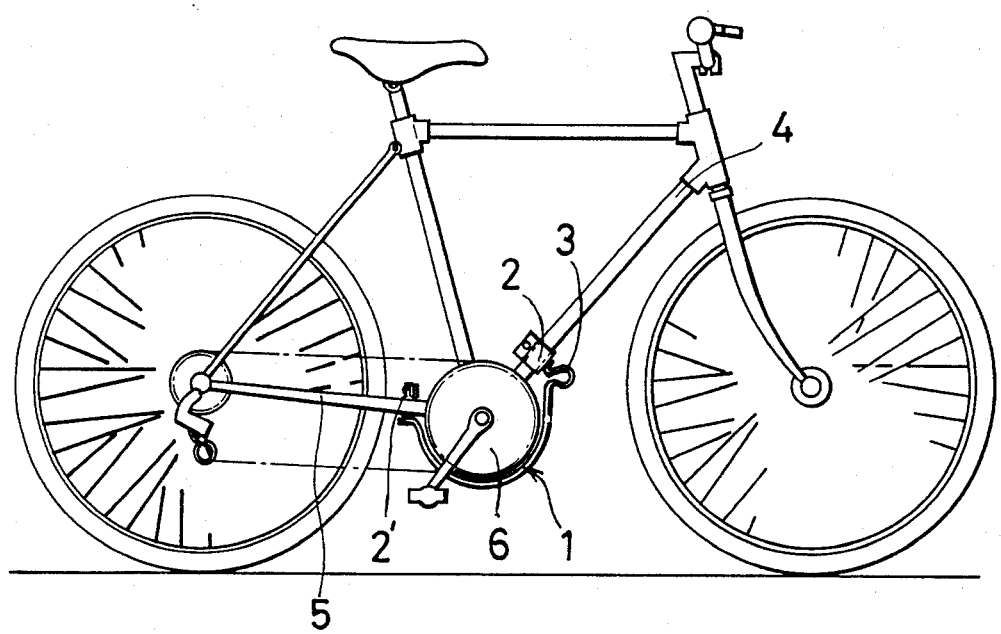
FIG. 1 is a side view of a bicycle with the guard according to the present invention.
Figure 2:
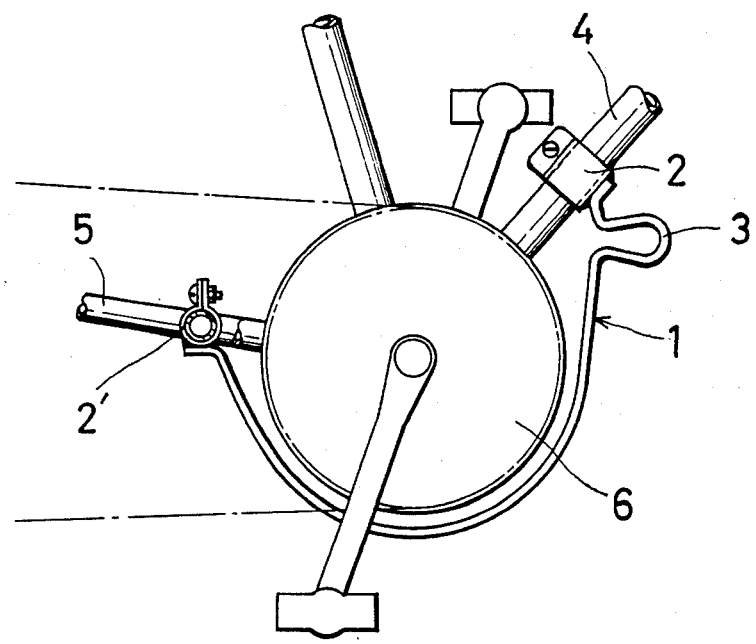
FIG. 2 is a partially cutaway enlarged side view of a portion thereof.

Referring to FIGS. 1-3, the numeral 1 generally designates a guard for a chain wheel 6 in accordance with the present invention. The guard has an arcuate body extending along the lower half of the outer periphery of the chain wheel 6 to cover it, a shock-absorbing portion 3, and metal fittings 2 at each end of the guard for mounting the guard to the frame of bicycle.

The guard 1 is made from metal in the form of a plate, shaft or pipe. As will be seen from FIG. 3, the guard is mounted directly under the body of the bicycle, not directly under the chain wheel 6, in the preferred embodiment.

The metal fittings 2, 2' have a ring-shaped band, a pair of projections extending therefrom, and a fastener such as a bolt and a nut. The metal fitting of any other structure may be used.

The shock absorbing portion 3 may be formed adjacent to one end of the guard 1 in the shape of letter U (FIG. 2) or S (FIG. 5), or adjacent to both ends of the guard in the shape of U (FIG. 4) by partially bending the guard 1. It may be formed by combining a coil spring or a plate spring with the guard.

The guard 1 is mounted on a lower pipe 4 and a crossbar between chain stays 5 with the metal fittings 2, 2'.

What is claimed is:

1. A guard for a chain wheel on a bicycle for use in the mountains, comprising an arcuate body extending along substantially the lower half of the outer periphery of the chain wheel so as to cover it, metal fittings for securing said guard at each end thereof to the bicycle frame, and a shock absorbing portion.

2. The guard for a chain wheel as claimed in claim 1, wherein said shock absorbing portion is formed by partially bending said body of the guard.

* * * * *